(12) United States Patent
Demoulin et al.

(10) Patent No.: US 8,687,892 B2
(45) Date of Patent: Apr. 1, 2014

(54) GENERATING A BINARY DESCRIPTOR REPRESENTING AN IMAGE PATCH

(75) Inventors: Vincent Demoulin, Montfort sur Meu (FR); Sajib Saha, Scullin ACT (AU); Lionel Oisel, La Nouaye (FR); Patrick Perez, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 41 days.

(21) Appl. No.: 13/528,965

(22) Filed: Jun. 21, 2012

(65) Prior Publication Data

US 2013/0343654 A1  Dec. 26, 2013

(51) Int. Cl.
*G06K 9/46* (2006.01)

(52) U.S. Cl.
USPC .......................................... 382/192

(58) Field of Classification Search
None
See application file for complete search history.

(56) References Cited

U.S. PATENT DOCUMENTS

| | | | | |
|---|---|---|---|---|
| 7,251,643 B2 * | 7/2007 | Gange et al. | ................... | 707/749 |
| 8,538,081 B2 * | 9/2013 | Ding et al. | ..................... | 382/103 |
| 2012/0051642 A1 * | 3/2012 | Berrani et al. | ................ | 382/180 |
| 2012/0201466 A1 * | 8/2012 | Funayama et al. | ............ | 382/195 |
| 2012/0316421 A1 * | 12/2012 | Kumar et al. | ................. | 600/407 |
| 2013/0022274 A1 * | 1/2013 | Lawrence Ashok Inigo et al. | .............................. | 382/195 |
| 2013/0101226 A1 * | 4/2013 | Tang et al. | .................... | 382/201 |

OTHER PUBLICATIONS

Colander et al., "BRIEF: Computing a Local Binary Descriptor Very Fast", IEEE Trans. on Pattern Analysis and Machine Intelligence, 'vol. 34, No. 7, Jul. 2012.
Leutenegger et al., "BRISK: Binary Robust Invariant Scalable Keypoints", 2011 IEEE Int. Conference on Computer Vision, 2011, pp. 2548-2555.
Colander et al., "BRIEF: Binary Robust Independent Elementary Features", CVLab, EPFL, Lausanne, Switzerland, 2010.

* cited by examiner

*Primary Examiner* — Vikkram Bali
(74) *Attorney, Agent, or Firm* — Robert D. Shedd; Patricia A. Verlangieri

(57) ABSTRACT

Embodiments described herein provide a system and method for generating a binary descriptor representing an image patch (200). The method includes determining a first specified number of features within an image patch (200), performing mean intensity difference tests for the first specified number of features, and generating a binary string of the first specified number of features for the image patch (200) based on the mean intensity difference tests. The method includes dividing the image patch (200) into a number of sub-patches (204), and, for each sub-patch (204), determining a second specified number of features within the sub-patch (204), performing mean intensity difference tests for the second specified number of features, and generating a binary string of the second specified number of features. The method also includes transforming the binary strings for the image patch (200) and the sub-patches (204) into a binary descriptor representing the image patch (200).

20 Claims, 4 Drawing Sheets

GENERATING A BINARY DESCRIPTOR REPRESENTING AN IMAGE PATCH

FIELD OF THE INVENTION

The present invention relates generally to generating a binary descriptor representing an image patch. More specifically, the present invention relates to a system and method for generating a binary descriptor representing an image patch using a number of identified features within the image patch.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Feature descriptors are used in a variety of imaging applications, including object recognition applications, 3D reconstruction applications, image retrieval applications, camera localization applications, and the like. Such feature descriptors may be used to compute abstractions of image information. The widespread use of feature descriptors has driven the development of a large number of alternative descriptors that are based on various concepts, such as Gaussian derivatives, moment invariants, complex features, phase-based local features, or the like. However, efficient descriptors are expected to have low computational complexity, easy matching characteristics, and high memory efficiency. Current descriptors generally do not include all of these qualities. For example, the descriptor called SIFT is highly discriminative but, being a 128-vector, is relatively slow to compute and match descriptors. The descriptor called SURF is faster to compute and match descriptors. However, since the SURF descriptor is a 64-vector of floating point values, it is represented by 256 bytes. This size may become costly as the number of descriptors to be stored increases. Several other extensions of SIFT have also been proposed, including dimensionality reduction techniques, quantization based techniques, descriptor binarization techniques, and the like. However, these techniques remain time consuming.

The descriptors described in "BRIEF: Binary Robust Independent Elementary Features," by Colander, et al., "BRIEF: Computing a Local Binary Descriptor Very Fast," by Colander, et al., and "BRISK: Binary Robust Invariant Scalable Keypoints," by Leutenegger, et al., respectively referred to as the BRIEF descriptor and the BRISK descriptor, are directly built through intensity based comparisons. However, even though BRIEF is relatively easy to compute, memory efficient, and fast on matching, the accuracy of BRIEF is not always as high as expected. The size of the BRIEF descriptor can be easily adjusted within the range from 16 to 64 bytes. In contrast, the BRISK descriptor has only been defined as a 64 bytes descriptor. Thus, the size of the BRISK descriptor can be cumbersome for many applications.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for generating a binary descriptor representing an image patch. There is provided a method including determining a first specified number of features within an image patch, performing mean intensity difference tests for the first specified number of features, and generating a binary string of the first specified number of features for the image patch based on the mean intensity difference tests. The method also includes dividing the image patch into a number of sub-patches, and, for each sub-patch, determining a second specified number of features within the sub-patch, performing mean intensity difference tests for the second specified number of features, and generating a binary string of the second specified number of features based on the mean intensity difference tests. The method further includes transforming the binary string for the image patch and the binary strings for the sub-patches into a binary descriptor representing the image patch.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
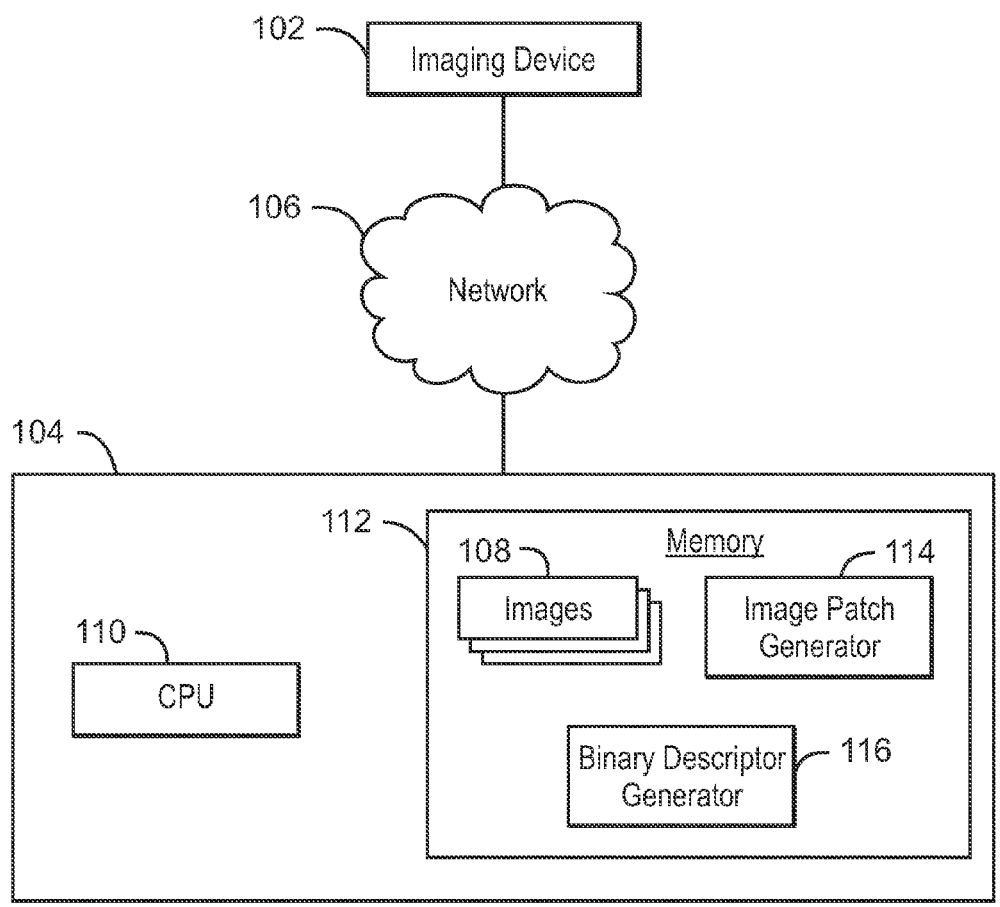
FIG. 1 is a block diagram of a system adapted to generate a binary descriptor representing an image patch, in accordance with embodiments of the present invention.

FIG. 1 is a block diagram of a system 100 adapted to generate a binary descriptor representing an image patch, in accordance with embodiments of the present invention. The system 100 may include an imaging device 102 in communication with a computing system 104. The computing system 104 may be any type of computing device that is capable of implementing the embodiments described herein, such as a laptop computer, desktop computer, tablet computer, mobile device, or the like. The imaging device 102 may be any type of imaging device that is capable of capturing images 108 and transmitting such images 108 to the computing system 104.

In the embodiment shown in FIG. 1, the imaging device 102 is in communication with the computing system 104 via a network 106. However, in alternate embodiments, the imaging device 102 may be in communication with the computing system 104 via an imaging device interface (not shown), or may reside directly within the computing system 104.

The computing system 104 may include a central processing unit (CPU) 110 and a memory 112. The memory 112 may be any type of addressable electronic storage such as a random access memory (RAM), read-only memory (ROM), hard disk drives, removable discs, solid-state memory, or the like.

The memory 112 may include an image patch generator 114, a binary descriptor generator 116, and the images 108 received from the imaging device 102. The image patch generator 114 may be adapted to generate a number of image patches for an image 108. Each image patch may be centered on a specific keypoint identified within the image 108. The binary descriptor generator 116 may be adapted to generate a binary descriptor representing each image patch. The binary descriptor may be generated using binary strings, or bit strings, that are created for specific groups of pixels within an image patch.

It will be appreciated that the embodiment described with regard to FIG. 1 is merely one possible embodiment of the system 100. FIG. 1 is not intended to indicate that all of the components discussed above are to be included within the system 100 in every case. Further, in alternate embodiments, any number of additional components not shown in FIG. 1 may be included within the system 100.

Figure 2:
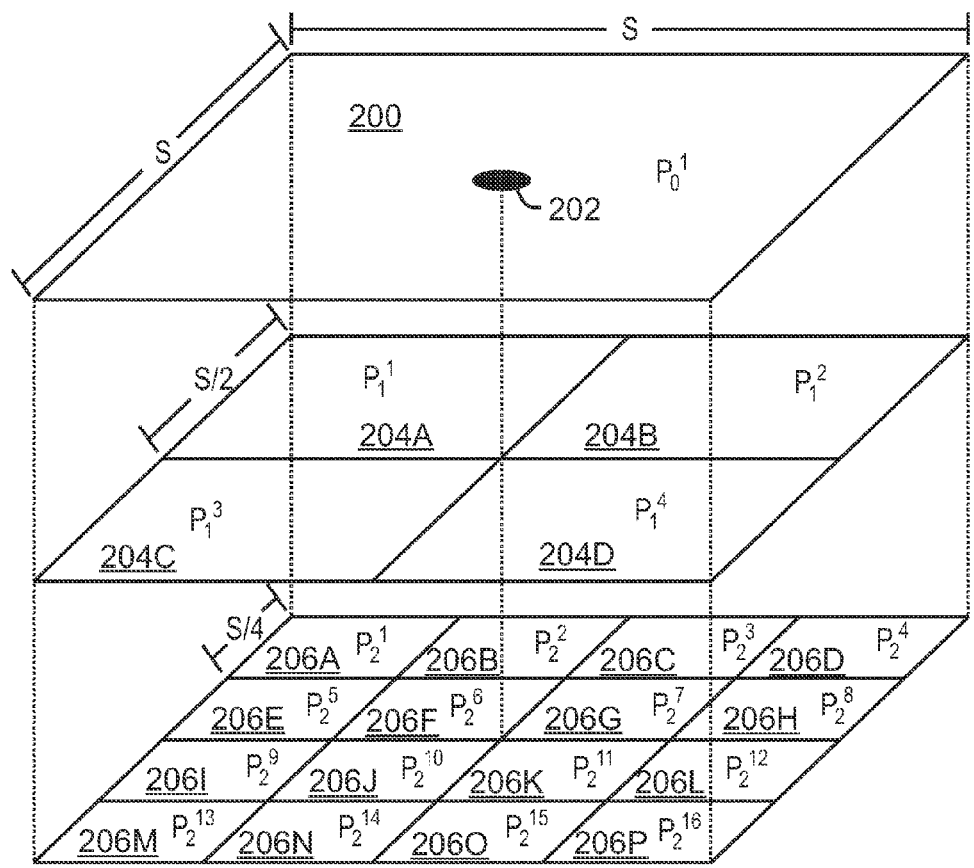
FIG. 2 is a schematic of a three-level decomposition of an image patch, in accordance with embodiments of the present invention.

FIG. 2 is a schematic of a three-level decomposition of an image patch 200, in accordance with embodiments of the present invention. The image patch 200, denoted by P, may be a portion of an image that is centered on a keypoint 202. The image patch 200 may be of size S by S, as shown in FIG. 2, and may include any number of pixels from the image.

A first specified number of features may be identified within the image patch 200. The features may be groups of pixels that are defined by a specific pattern. In some embodiments, the features are defined by Haar basis functions.

The mean intensity of each feature may be computed by determining the average of the intensities of all the pixels within each feature. Mean intensity difference tests may then be performed for the features within the image patch 200. A mean intensity difference test $\tau$ performed for pixel groups, or features, X and Y in patch P may be defined as shown below in Eq. 1.

$$\tau(P; X; Y) := \begin{cases} 1, & \overline{P_X} > \overline{P_Y} \\ 0, & \text{otherwise} \end{cases} \quad (1)$$

According to Eq. 1, $\overline{P_X}$ and $\overline{P_Y}$ represent the mean intensities for the pixel groups X and Y, respectively.

The mean intensity difference tests $\tau$ may be performed for the first specified number of features within the image patch 200. The first specified number may be denoted by $L_0$, and $L_0$ may be defined as, for example, $1 \leq L_0 \leq 32$. The results of the mean intensity differences tests $\tau$ for the first specified number $L_0$ of features may be used to generate an $L_0$-dimensional binary string $B_{L_0}(P)$. The $L_0$-dimensional binary string $B_{L_0}(P)$ may correspond to the decimal counterpart of $D_{L_0}(P)$, defined below Eq. 2.

$$D_{L_0}(P) = \Sigma^{1 \leq k \leq L_0} 2^{k-1} \tau(P; X_k; Y_k) \quad (2)$$

The original image patch P 200 of size S by S may be divided into four sub-patches 204A-D of size S/2 by S/2 to create a second level decomposition of the image patch P 200. A second specified number of features may be identified within each sub-patch 204A-D. The mean intensity difference tests $\tau$ may be performed for the second specified number of features within the each sub-patch 204A-D. The second specified number may be denoted by $L_1$, and $L_1$ may be defined as, for example, $1 \leq L_1 \leq 32$. The results of the mean intensity differences tests $\tau$ for the second specified number $L_1$ of features may be used to generate an $L_1$-dimensional binary string $B_{L_1}(P)$ for each sub-patch 204A-D. Thus, a total of four $L_1$-dimensional binary strings $B_{L_1}(P)$ may be generated. The $L_1$-dimensional binary string $B_1(P)$ for each sub-patch 204A-D may correspond to the decimal counterpart of $D_{L_1}(P)$, defined below in Eq. 3.

$$D_{L_1}(P) = \tau_{1 \leq k \leq L_1} 2^{k-1} \tau(P; X_k; Y_k) \quad (3)$$

Each sub-patch 204A-D may be divided into four secondary sub-patches 206A-P of size S/4 by S/4 to create a third level decomposition of the image patch P 200 including a total of sixteen secondary sub-patches 206A-P. For example, the sub-patch 204A may be divided into the secondary sub-patches 206A, 206B, 206E, and 206F, as shown in FIG. 2. A third specified number of features may be identified within each secondary sub-patch 206A-P. The mean intensity difference tests $\tau$ may be performed for the third specified number of features within the each secondary sub-patch 206A-P. The third specified number may be denoted by $L_2$, and $L_2$ may be defined as, for example, $1 \leq L_2 \leq 32$. The results of the mean intensity differences tests $\tau$ for the third specified number $L_2$ of features may be used to generate an $L_2$-dimensional binary string $B_{L_2}(P)$ for each secondary sub-patch 206A-P. Thus, a total of sixteen $L_2$-dimensional binary strings $B_{L_2}(P)$ may be generated. The $L_2$-dimensional binary string $B_2(P)$ for each secondary sub-patch 206A-P may correspond to the decimal counterpart of $D_{L_2}(P)$, defined below in Eq. 4.

$$D_{L_2}(P) = \Sigma_{1 \leq k \leq L_2} 2^{k-1} \tau(P; X_k; Y_k) \quad (4)$$

The binary strings may then be transformed into a binary descriptor A(P) that represents the image patch 200. Specifically, the binary descriptor A(P) may be defined as the concatenation of the $L_0$-dimensional binary string $B_{L_0}(P)$ for the image patch 200, the four $L_1$-dimensional binary strings $B_{L_1}(P)$ for the sub-patches 204A-D, and the sixteen $L_2$-dimensional binary strings $B_{L_2}(P)$ for the secondary sub-patches 206A-P, as shown below in Eq. 5.

$$A(P) = B_{L_0}(P_0^1) \& B_{L_1}(P_1^1) \& \ldots \& B_{L_1}(P_1^4) \& B_{L_2}(P_2^1) \& B_{L_2}(P_2^2) \& \ldots \& B_{L_2}(P_2^{16}) \quad (5)$$

In various embodiments, the length of the binary descriptor can be selected by adjusting the first specified number $L_0$, the second specified number $L_1$, and/or the third specified number $L_2$. For example, in order to obtain a 256-dimensional binary descriptor, $L_0$ and $L_1$ may be set to 32, and $L_2$ may be set to 6.

In addition, in some embodiments, binary descriptors are generated for any number of additional related image patches. The related image patches may be obtained from a same image as the image patch 200, or may be obtained from an image of a same scene, for example. A similarity between any two of the binary descriptors may be determined by computing a Hamming distance between the two binary descriptors. A lower value for the Hamming distance indicates a greater similarity between the two binary descriptors. Thus, the calculation of the Hamming distances between binary descriptors may allow for the matching of binary descriptors.

Figure 3:
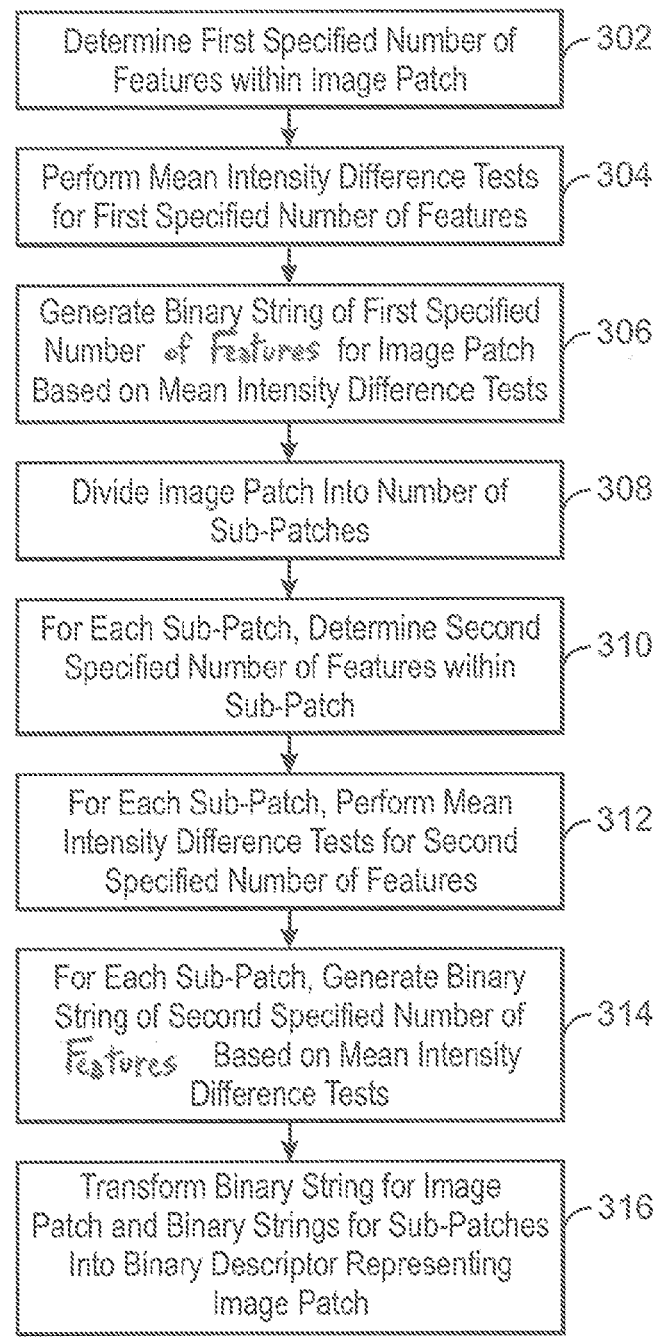
FIG. 3 is a process flow diagram of a method for generating a binary descriptor representing an image patch, in accordance with embodiments of the present invention.

FIG. 3 is a process flow diagram of a method 300 for generating a binary descriptor representing an image patch, in accordance with embodiments of the present invention. In various embodiments, the method 300 is executed by the computing system 104 described above with respect to FIG. 1. The image patch that is utilized according to the method 300 may be generated from an image. The image patch may be centered on a specific keypoint within the image.

The method 300 begins at block 302, at which a first specified number of features within an image patch are determined. Each feature may include a group of pixels of a particular pattern. In addition, the mean intensity of the group of pixels within each feature may be determined.

At block 304, mean intensity difference tests are performed for the first specified number of features. The mean intensity difference tests may be performed as described above with respect to the image patch 200 of FIG. 2. At block 306, a binary string of the first specified number of features is generated for the image patch based on the mean intensity difference tests.

At block 308, the image patch is divided into a number of sub-patches. The sub-patches may be of equal size, and may be centered on the keypoint of the image patch. At block 310, a second specified number of features are determined for each sub-patch. Each feature may include a group of pixels of a particular pattern. In addition, the mean intensity of the group of pixels within each feature may be determined.

At block 312, mean intensity difference tests are performed for the second specified number of features for each sub-patch. At block 314, a binary string of the second specified number of features is generated for each sub-patch based on the mean intensity difference tests. Thus, the total number of binary strings generated at block 314 is equal to the second specified number.

At block 316, the binary string for the image patch and the binary strings for the sub-patches are transformed into a binary descriptor representing the image patch. In various embodiments, the binary descriptor is generated by concatenating the binary string for the image patch and the binary strings for the sub-patches.

The generated binary descriptor may be used for a variety of applications. For example, the binary descriptor may be used for object recognition applications by allowing for the identification of one or more objects represented by pixels within the image patch. In some embodiments, the image patch may be displayed such that the one or more identified objects are emphasized in some manner. Further, the binary descriptor may be used for 3D reconstruction applications, image retrieval applications, camera localization applications, or the like. For example, in some embodiments, the generated binary descriptor, as well as any number of additional binary descriptors generated from a common low quality image, may be used to transform the low quality image into a high quality image.

It will be appreciated that the embodiment described with regard to FIG. 3 is merely one possible embodiment of the method 300. FIG. 3 is not intended to indicate that the steps of the method 300 are to be executed in any particular order, or that all of the steps of the method 300 are to be included in every case. Further, in alternate embodiments, any number of additional steps not shown in FIG. 3 may be included within the method 300. For example, the length of the binary descriptor may be dynamically adjusted by changing the first specified number or the second specified number, or both. The length of the binary descriptor may be equal to the sum of the first specified number and the product of the second specified number and the number of sub-patches.

In various embodiments, the method 300 may include dividing each sub-patch into a number of secondary sub-patches. For each secondary sub-patch, a third specified number of features may be determined, mean intensity difference tests may be performed for the third specified number of features, and a binary string of the third specified number of features may be generated based on the mean intensity difference tests. The binary string for the image patch, the binary strings for the sub-patches, and the binary strings for the secondary sub-patches may be transformed into a binary descriptor representing the image patch via, for example, a concatenation of the binary strings. The length of the binary descriptor may be equal to the sum of the first specified number, the product of the second specified number and the number of sub-patches, and the product of the third specified number and the number of secondary sub-patches. Thus, the length of the binary descriptor may be dynamically adjusted by changing the first specified number, the second specified number, or the third specified number, or any combinations thereof.

Further, in some embodiments, a second binary descriptor representing a second image patch may be generated. The second image patch may be related to the image patch discussed above in some way, or may be the same as the image patch. A similarity between the binary descriptor and the second binary descriptor may be determined by computing a Hamming distance between the binary descriptor and the second binary descriptor. A smaller Hamming distance between the two binary descriptors indicates a greater similarity. In some embodiments, computing the similarity between binary descriptors may allow for the matching of related image patches.

Figure 4:
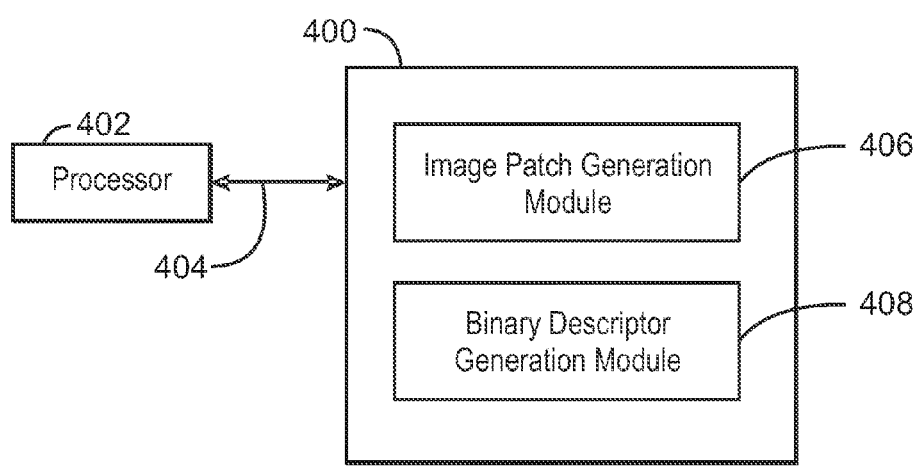
FIG. 4 is a block diagram showing a tangible, non-transitory, computer-readable medium that stores a protocol adapted to generate a binary descriptor representing an image patch, in accordance with embodiments of the present invention.

FIG. 4 is a block diagram showing a tangible, non-transitory, computer-readable medium 400 that stores a protocol adapted to generate a binary descriptor representing an image patch, in accordance with embodiments of the present invention. The tangible, non-transitory, computer-readable medium 400 may be accessed by a processor 402 over a computer bus 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, an image patch generation module 406 may be adapted to generate any number of image patches from an image, wherein each image patch is centered on a specific keypoint within the image. A binary descriptor generation module 408 may be adapted to generate a binary descriptor for each image patch using binary strings generated based on features within the image patch and any number of sub-patches.

It will be appreciated that the embodiment described with regard to FIG. 4 is merely one possible embodiment of the tangible, non-transitory, computer-readable medium 400. FIG. 4 is not intended to indicate that all of the software components described above are to be included within the tangible, non-transitory, computer-readable medium 400 in every case. Further, in alternate embodiments, any number of additional software components not shown in FIG. 4 may be included within the tangible, non-transitory, computer-readable medium 400.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A method for generating a binary descriptor representing an image patch (200), comprising:
   determining a first specified number of features within an image patch (200);
   performing mean intensity difference tests for the first specified number of features;
   generating a binary string of the first specified number of features for the image patch (200) based on the mean intensity difference tests;
   dividing the image patch (200) into a plurality of sub-patches (204);
   for each sub-patch (204), determining a second specified number of features within the sub-patch (204);
   for each sub-patch (204), performing mean intensity difference tests for the second specified number of features;
   for each sub-patch (204), generating a binary string of the second specified number of features based on the mean intensity difference tests; and
   transforming the binary string for the image patch (200) and the binary strings for the sub-patches (204) into a binary descriptor representing the image patch (200).

2. The method of claim 1, wherein transforming the binary string for the image patch (200) and the binary strings for the sub-patches (204) into the binary descriptor comprises concatenating the binary string for the image patch (200) and the binary strings for the sub-patches (204).

3. The method of claim 1, comprising:
   dividing each sub-patch (204) into a plurality of secondary sub-patches (206);
   for each secondary sub-patch (206), determining a third specified number of features within the secondary sub-patch (206);
   for each secondary sub-patch (206), performing mean intensity difference tests for the third specified number of features;
   for each secondary sub-patch (206), generating a binary string of the third specified number of features based on the mean intensity difference tests; and
   transforming the binary string for the image patch (200), the binary strings for the sub-patches (204), and the binary strings for the secondary sub-patches (206) into a binary descriptor representing the image patch (200).

4. The method of claim 1, wherein each feature comprises a group of pixels comprising a particular pattern.

5. The method of claim 4, wherein determining a feature comprises determining a mean intensity for the group of pixels within the feature.

6. The method of claim 1, comprising generating the image patch (200) from an image, wherein the image patch (200) is centered on a keypoint (202) within the image.

7. The method of claim 1, comprising adjusting a length of the binary descriptor by adjusting the first specified number or the second specified number, or both.

8. The method of claim 1, comprising:
   generating a second binary descriptor representing a second image patch; and
   determining a similarity between the binary descriptor and the second binary descriptor by computing a Hamming distance between the binary descriptor and the second binary descriptor.

9. The method of claim 1, comprising using the binary descriptor to identify an object represented by pixels within the image patch (200).

10. The method of claim 9, comprising displaying the image patch (200) such that the object within the image patch (200) is emphasized.

11. A computing system (104) for generating a binary descriptor representing an image patch (200), comprising:
    a processor (110) that is adapted to execute stored instructions; and
    a memory (112) that stores instructions, the memory (112) comprising processor executable code that, when executed by the processor (110), is adapted to:
    determine a first specified number of features within an image patch (200);
    perform mean intensity difference tests for the first specified number of features,
    generate a binary string of the first specified number of features for the image patch (200) based on the mean intensity difference tests;
    divide the image patch (200) into a plurality of sub-patches (204);
    for each sub-patch (204), determine a second specified number of features within the sub-patch (204);
    for each sub-patch (204), perform mean intensity difference tests for the second specified number of features,
    for each sub-patch (204), generate a binary string of the second specified number of features based on the mean intensity difference tests; and
    concatenate the binary string for the image patch (200) and the binary strings for the sub-patches (204) to generate a binary descriptor representing the image patch (200).

12. The computing system (104) of claim 11, wherein a length of the binary descriptor comprises a sum of the first specified number and a product of the second specified number and a total number of sub-patches.

13. The computing system (104) of claim 11, wherein each feature comprises a group of pixels comprising a particular pattern.

14. The computing system (104) of claim 11, wherein the processor executable code is adapted to identify an object represented by pixels within the image patch (200) using the binary descriptor.

15. The computing system (104) of claim 11, wherein the processor executable code is adapted to:
    generate a second binary descriptor for a second image patch;
    compare the second binary descriptor to the binary descriptor by computing a Hamming distance comprising a similarity between the second binary descriptor and the binary descriptor.

16. The computing system (104) of claim 11, wherein the processor executable code is adapted to:
    generate binary descriptors for a plurality of image patches obtained from a low quality image; and
    transform the low quality image into a high quality image using the binary descriptors.

17. A tangible, non-transitory, computer-readable medium (400) comprising code configured to direct a processor (402) to:
    determine a first specified number of pixel groups within an image patch (200);
    perform mean intensity difference tests for the first specified number of pixel groups,
    generate a bit string of the first specified number of features for the image patch (200) based on the mean intensity difference tests;
    split the image patch (200) into a plurality of sub-patches (204);

for each sub-patch (204), determine a second specified number of pixel groups within the sub-patch (204);

for each sub-patch (204), perform mean intensity difference tests for the second specified number of pixel groups, for each sub-patch (204), generate a bit string of the second specified number of features based on the mean intensity difference tests; and generate a binary descriptor representing the image patch (200) by concatenating the bit string for the image patch (200) and the bit strings for the sub-patches (204).

18. The tangible, non-transitory, computer-readable medium (400) of claim 17, wherein each pixel group comprises a specific pattern of pixels.

19. The tangible, non-transitory, computer-readable medium (400) of claim 17, comprising code configured to direct the processor (402) to:

split each sub-patch (204) into a plurality of secondary sub-patches (206);

for each secondary sub-patch (206), determine a third specified number of pixel groups within the secondary sub-patch (206);

for each secondary sub-patch (206), perform mean intensity difference tests for the third specified number of pixel groups, for each secondary sub-patch (206), generate a bit string of the third specified number of features based on the mean intensity difference tests; and generate a binary descriptor representing the image patch (200) by concatenating the bit string for the image patch (200), the bit strings for the sub-patches (204), and the bit strings for the secondary sub-patches (206).

20. The tangible, non-transitory, computer-readable medium (400) of claim 17, comprising code configured to direct the processor (404) to identify one or more objects within the image patch (200) based on the binary descriptor.

* * * * *